US008479158B2

(12) United States Patent    (10) Patent No.: US 8,479,158 B2
Chen et al.    (45) Date of Patent: *Jul. 2, 2013

(54) BUSINESS INFORMATION WAREHOUSE TOOLKIT AND LANGUAGE FOR WAREHOUSING SIMPLIFICATION AND AUTOMATION

(75) Inventors: Ying Chen, San Jose, CA (US); Bin He, San Jose, CA (US); Ana Lelescu, Morgan Hill, CA (US); James J. Rhodes, Los Gatoes, CA (US); Rui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1069 days.

This patent is subject to a terminal disclaimer.

(21) Appl. No.: 12/134,011

(22) Filed: Jun. 5, 2008

(65) Prior Publication Data

US 2008/0306987 A1    Dec. 11, 2008

Related U.S. Application Data

(63) Continuation of application No. 11/759,851, filed on Jun. 7, 2007.

(51) Int. Cl.
*G06F 9/44* (2006.01)
(52) U.S. Cl.
USPC ............................................................ 717/117
(58) Field of Classification Search
USPC ... 717/106, 143, 175, 117; 709/206; 719/328; 702/84; 714/47.3; 358/403; 707/999.102, 707/999.104, 999.107, 999.204, 4; 705/2
See application file for complete search history.

(56) References Cited

U.S. PATENT DOCUMENTS

| 5,448,740 | A | 9/1995 | Kiri et al. |
| 5,815,713 | A | 9/1998 | Sanders |
| 6,772,409 | B1 | 8/2004 | Chawla et al. |
| 7,403,901 | B1* | 7/2008 | Carley et al. ...................... 705/2 |
| 7,519,962 | B2* | 4/2009 | Aman ........................... 717/143 |
| 2003/0167277 | A1* | 9/2003 | Hejlsberg et al. ............. 707/102 |
| 2003/0172368 | A1* | 9/2003 | Alumbaugh et al. ......... 717/106 |
| 2004/0148278 | A1 | 7/2004 | Milo et al. |
| 2004/0254948 | A1 | 12/2004 | Yao |
| 2005/0006034 | A1 | 1/2005 | Judkins |
| 2005/0091273 | A1* | 4/2005 | Merritt ....................... 707/104.1 |

(Continued)

OTHER PUBLICATIONS

Amer-Yahia et al., "A declarative approach to optimize bulk loading into databases", ACM Transactions on Database Systems (TODS), vol. 29, Issue 2 ) Jun. 2004), pp. 233-281, USA.

*Primary Examiner* — Tuan A Vu
(74) *Attorney, Agent, or Firm* — Shimokaji & Assoc., P.C.

(57) ABSTRACT

A method for use with an information (or data) warehouse comprises managing the information warehouse with instructions in a declarative language. The instructions specify information warehouse-level tasks to be done without specifying certain details of how the tasks are to be implemented, for example, using databases and text indexers. The details are hidden from the user and include, for example, in an information warehouse having a FACT table that joins two or more dimension tables, details of database level operations when structured data are being handled, including database command line utilities, database drivers, and structured query language (SQL) statements; and details of text-indexing engines when unstructured data are being handled. The information warehouse is managed in a dynamic way in which different tasks—such as data loading tasks and information warehouse construction tasks—may be interleaved (i.e., there is no particular order in which the different tasks must be completed).

26 Claims, 14 Drawing Sheets

U.S. PATENT DOCUMENTS

2005/0198630 A1* 9/2005 Tamma et al. .............. 717/175
2005/0262039 A1   11/2005 Kreulen et al.
2005/0262129 A1   11/2005 Hacigumus et al.
2006/0004745 A1*  1/2006 Kuhn et al. .................. 707/4
2007/0061287 A1   3/2007 Le et al.
2007/0288534 A1* 12/2007 Zak et al. ................... 707/204

* cited by examiner

700

CREATE INFORMATION WAREHOUSE sale
    IN DATABASE company;

USE INFORMATION WAREHOUSE company sale;

SET FACT_TABLE = sales;

CREATE DIMENSION amount FIELDS (
    dollars_sold TYPE FLOAT INDEX DB,
    profit TYPE FLOAT INDEX DB)
    MODEL USING MEASURE ON FACT;

CREATE DIMENSION date FIELDS (
    day TYPE INT INDEX DB,
    month TYPE INT INDEX DB,
    year TYPE INT INDEX DB)
    MODEL USING STAR ON FACT;

CREATE DIMENSION branch FIELDS (
    bname TYPE VARCHAR (500) INDEX DB,
    btype TYPE VARCHAR (100) INDEX DB)
    MODEL USING STAR ON FACT;

CREATE DIMENSION location FIELDS (
    street TYPE VARCHAR (200) INDEX DB,
    city TYPE VARCHAR (50) INDEX DB,
    state TYPE VARCHAR (2) INDEX DB)
    MODEL USING STAR ON branch;

CREATE DIMENSION product FIELDS (
    pname TYPE VARCHAR (200) INDEX DB,
    ptype TYPE VARCHAR (50) INDEX DB,
    weight TYPE INT INDEX DB)
    MODEL USING STAR ON FACT;

CREATE DIMENSION feedback FIELDS (
    feedback TYPE CLOB (100K) INDEX TEXT,
    notes TYPE CLOB (100K) INDEX NO)
    MODEL USING STAR ON FACT;

CREATE DIMENSION attachments FIELDS (
    attachment TYPE CLOB (50M) INDEX TEXT)
    MODEL USING FILE ON FACT;

FIG. 7

```
<doc>
<article>
 <author>
    <fname>Jim</fname>
    <lname>Gray</lname>
 </author>
 <author>
    <fname>Jeffrey</fname>
    <lname>Ullman</lname>
 </author>
</article>
<article>
...
</article>
</doc>
```

(1)

```
<doc>
<article>
   <author fname="Jim" lname="Grey" />
   <author fname="Jeffrey" lname="Ullman" />
</article>
<article>
...
</article>
</doc>
```

(2)

```
<doc>
<article>
 <author>
     <item attr="fname" value="Jim">
     <item attr="lname" value="Grey">
 </author>
 <author>
     <item attr="fname" value="Jeffrey">
     <item attr="lname" value="Ullman">
 </author>
</article>
<article>
...
</article>
</doc>
```

(3)

```
<doc>
<article>
   <item attr="author">
      <item attr="fname">Jim</item>
      <item attr="lname">Gray</item>
   </item>
   <item attr="author">
      <item attr="fname">Jeffery</item>
      <item attr="lname">Ullman</item>
   </item>
</article>
<article>
...
</article>
</doc>
```

```
<doc>
<A>
   <B>v1</B>
   <B>v2</B>
   <C>v3</C>
   <C>v4</C>
</A>
<A>
...
</A>
</doc>
```

```
<doc>
<A>
   <D>
     <B>v1</B>
     <C>v3</C>
   </D>
   <D>
     <B>v2</B>
     <C>v4</C>
   </D>
</A>
<A>
...
</A>
</doc>
```

```
<doc>
<A>
   <D>
     <B>v1</B>
     <B>v2</B>
     <C>v3</C>
   </D>
   <D>
     <C>v4</C>
   </D>
</A>
<A>
...
</A>
</doc>
```

Generated Values

| B | C |
|---|---|
| v1 | v3 |
| v1 | v4 |
| v2 | v3 |
| v2 | v4 |
| ... | ... |

(1)

| B | C |
|---|---|
| v1 | v3 |
| v2 | v4 |
| ... | ... |

(2)

| B | C |
|---|---|
| v1 | v3 |
| v2 | v3 |
| null | v4 |
| ... | ... |

BUSINESS INFORMATION WAREHOUSE TOOLKIT AND LANGUAGE FOR WAREHOUSING SIMPLIFICATION AND AUTOMATION

BACKGROUND OF THE INVENTION

The present invention relates generally to the field of information storage and retrieval and, more particularly, to automating and simplifying information warehouse management system tasks using a high-level declarative information warehousing language and runtime system components to make system operational details transparent to the user.

Rapidly leveraging information analytics technologies (e.g., to mine the mounting information in structured and unstructured forms, derive business insights and improve decision making) is becoming increasingly critical to today's business success. One of the key enablers of new information analytics technologies will be an information warehouse management system (IWMS) that processes different types and forms of information, as well as builds and maintains the information warehouse (IW) effectively. Although traditional multi-dimensional data warehousing techniques, coupled with the well-known extract, transform, and load (ETL) processes, may meet some of the requirements in an IWMS, they generally lack adequacy in several major respects: 1) they often lack comprehensive support for both structured and unstructured data processing; 2) they usually are database-centric and require detailed database and warehouse knowledge to perform IWMS tasks, and hence are tedious and time-consuming to operate and learn; 3) they are often inflexible and insufficient in coping with a wide variety of on-going IW maintenance tasks—such as adding new dimensions and handling regular and lengthy data updates with potential failures and errors.

Although data warehousing techniques—such as multi-dimensional data warehouse models and ETL processing—have been widely practiced in industry, they are increasingly inadequate in their functionalities due to major changes in today's information dynamics, where there is a need for comprehensive support for structured and unstructured data, simple and high-level IW operations, and on-going IW maintenance operations.

Existing data warehousing techniques are mainly designed to handle structured data. However, a large fraction of business enterprise data is in unstructured data formats, e.g., call center problem tickets and customer complaints. Because it is vital for an IWMS to support both structured and unstructured types of data, there is a need for comprehensive support for structured and unstructured data.

The prominent and rapid adoption of information analytics technologies—such as text mining and business intelligence (BI) tools—mandates simple and efficient IWMS systems that can quickly process various information sources and build information warehouses. Current data warehouse systems, however, are typically hard to use and require detailed database and data warehouse knowledge. Even with skilled staff, building data warehouses often takes multi-person weeks and months to complete. With the need to support unstructured data, knowledge and skills about full-text indexers and search engines have become necessary. It is often unrealistic to assume the existence of such knowledge and skills in the business world. For instance, organizations that want to use BI and text mining tools may not have strong database administrators (DBAs) for handling complex ETL processing. Thus, there is a need for IWMS that provide simple and high-level IW operations.

Currently existing ETL solutions for information warehouse management generally focus on the single aspect of building the information warehouse. It is often assumed that once the information warehouse is fully constructed and the data are completely loaded from the given set of data sources, the project is completed. In other words, no subsequent modifications to the data warehouse will be needed. In practice, however, information is constantly changing. It is common for users to frequently adjust the information warehouses by adding new dimensions to an existing IW or modifying and loading new data on a regular basis. All such operations must ensure the overall IW integrity and consistency. Furthermore, due to the on-going data updating and loading, it becomes extremely important for the IWMS system to cope with various forms of system failures and potential error conditions. Current IWMS generally have little or no support for fast failure recovery, error correction, or on-going IW schema changes. The common practice is to simply rebuild the data warehouses from scratch each time that changes are required or to perform lengthy and error-prone manual IW operations. Thus, there is a need for an IWMS that provides on-going IW maintenance operations.

As can be seen, there is a need for information warehouse management systems that provide comprehensive support for structured and unstructured data; simple and high-level warehouse operations; and on-going IW maintenance operations.

SUMMARY OF THE INVENTION

In one embodiment of the present invention, a method for information warehouse construction comprises providing a language specification for information warehouse construction, the language specification having information warehouse (IW) level commands and dimension level commands; and constructing an information warehouse based on a script comprising at least one of the IW level commands and the dimension level commands according to the language specification for information warehouse construction.

In another embodiment of the present invention, a method for data loading in an information warehouse comprises providing a language specification for data loading in an information warehouse, the language specification having source mapping commands and data loading commands; and loading data into an information warehouse based on a script comprising at least one of the source mapping commands and data loading commands according to the language specification for data loading.

In yet another embodiment of the present invention, a method for data maintenance of an information warehouse comprises providing a language specification for information warehouse (IW) maintenance in an information warehouse, the language specification having failure recovery commands and error correction commands; and performing an IW maintenance operation on the information warehouse based on a script comprising at least one of the failure recovery commands and error correction commands according to the language specification for IW maintenance.

In still another embodiment of the present invention, an information warehouse system comprises a front-end graphical user interface that accepts inputs from a user and generates commands in a declarative information warehouse language; an information warehouse language processor that receives the commands from the user interface and provides system level, database level, and indexing engine level commands for performing tasks specified by the commands from the interface; and a warehouse builder that receives the system level, database level, and indexing engine level commands from the information warehouse language processor and performs tasks specified by the system level, database level, and indexing engine level commands to build an information warehouse according to the commands from the user interface, the system level, database level, and indexing engine level commands being hidden from the user.

In still another embodiment of the present invention, a computer program product for use with an information warehouse comprises a computer useable medium including a computer readable program, in which the computer readable program when executed on a computer causes the computer to accept commands of a declarative information warehouse language provided by a script; parse the commands from the script; generate data description language commands from the parsed commands; and execute the data description language commands to construct an information warehouse.

In a further embodiment of the present invention, a computer program product for use with an information warehouse comprises a computer useable medium including a computer readable program, in which the computer readable program when executed on a computer causes the computer to accept commands of a declarative information warehouse language provided by a script; parse the commands from the script; extract desired data from a source file according to the parsed commands; transform the extracted data into a target format according to the parsed commands; and load the transformed data into information warehouse tables and file system locations according to the parsed commands.

These and other features, aspects, and advantages of the present invention will become better understood with reference to the following drawings, description, and claims.

BRIEF DESCRIPTION OF THE DRAWINGS

FIG. 7 is an information warehouse language script for building the information warehouse of FIG. 6 in accordance with one embodiment of the present invention;

FIG. 8 is a block diagram of an example showing how the same data can be organized into different extensible markup language (XML) formats according to an embodiment of the present invention;

FIG. 11 is a diagram showing different data relationships for three seemingly similar XML segments and an example of different data loading results for the dimension table according to an embodiment of the present invention;

DETAILED DESCRIPTION OF THE INVENTION

Figure 1:
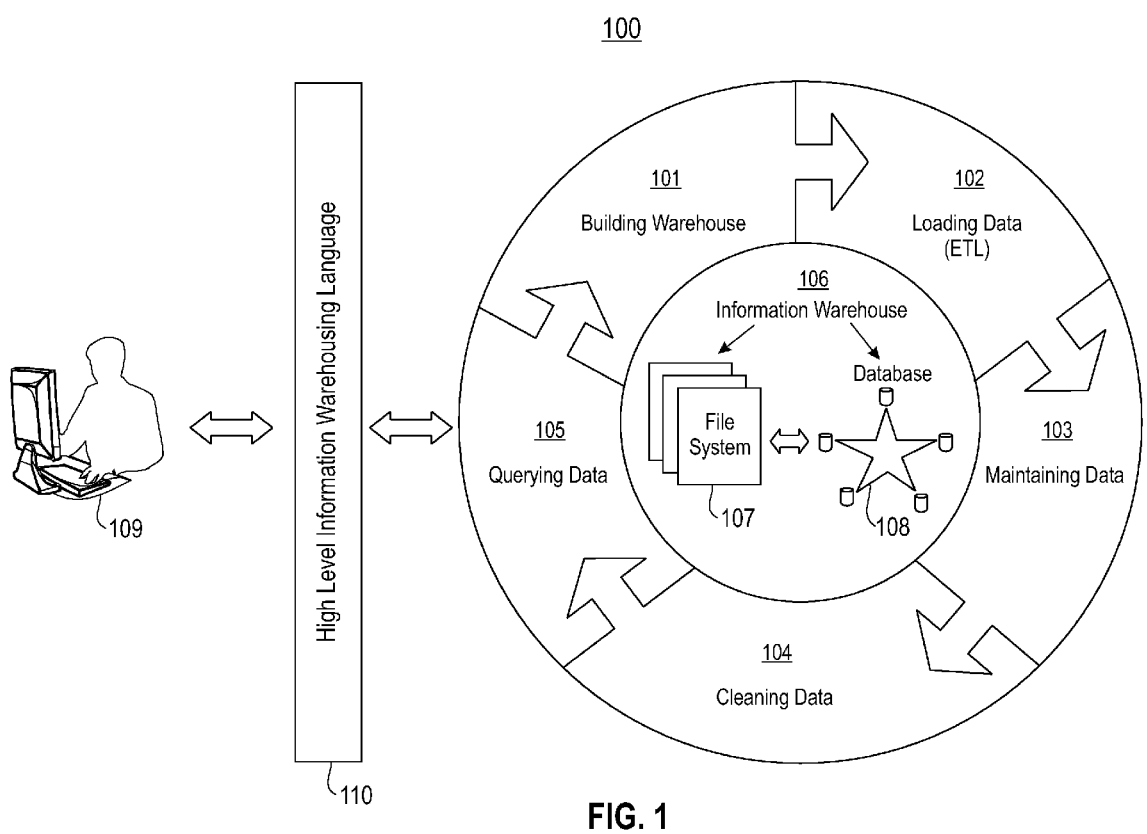
FIG. 1 is a system overview diagram illustrating a system for information warehouse management in accordance with an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide systems and methods for information warehouse (IW) users without SQL (sequential query language) and database expertise to perform IW tasks without significant training. Embodiments of the present invention may provide information warehouse management systems (IWMS) that 1) support high-level operations for users to specify what they want to do, 2) automatically figures out the details of how to do what the user specifies, and 3) handles the IW operations accordingly. IWMS in accordance with embodiments of the present invention may improve system usability, robustness and performance for businesses that increasingly rely on vast amounts of information. Data warehousing may be considered an essential step towards exploring, understanding and analyzing business information for better and faster decision making. Embodiments of the present invention may be useful to commercial enterprises that build and maintain increasingly large information warehouses to enable advanced information analytics and to improve the "business value" of information.

Embodiments of the present invention may provide novel information warehouse management systems that provide support for both structured and unstructured types of data, in contrast to prior art systems—such as traditional multi-dimensional data warehouses that are mainly designed for on-line analytical processing (OLAP) applications of structured data alone and whose main focus is warehouse schema design and data mining operations for structured data. Embodiments of the present invention, by way of contrast, may support both text mining as well as BI applications and integrate both structured and unstructured data in each.

Prior art data warehousing also generally assumes that skilled database administrators (DBAs) are available for most of the data warehousing tasks. Embodiments of the present invention use a high-level declarative language to enable a much simpler, more efficient, and more easy-to-use IW toolkit than ETL (extract, transform, load) products existing in the prior art—such as: Kalido®, Sunopsis®, IBM DB2® Data Warehouse Edition®, IBM WebSphere® Information Integrator (also referred to as Ascential®), and Microsoft BI Accelerator®, which are often too complex (lacking in simple, high-level operations) to be usable or cannot handle structured and unstructured data in the same system.

Also, no incremental data maintenance operations are supported in these products, in contrast to, for example, failure recovery for data loading (e.g., using checkpointing) provided by embodiments of the present invention; error recovery (e.g., using versioning for undo and redo operations of data loading); and other maintenance operations provided by embodiments of the present invention.

FIG. 1 shows a system overview for an information warehouse management system 100 in accordance with an embodiment of the present invention. The major information warehousing activities may be centered around five areas: building warehouse tasks 101, loading data tasks 102, maintaining data tasks 103, cleaning data tasks 104, and querying data tasks 105, as shown in FIG. 1.

Typically, the first task involved in information warehousing is to construct an information warehouse (e.g., perform building warehouse tasks 101) by designing the right data warehouse model, designing the appropriate schemas, e.g., tables and dimensions that constitute the information warehouse 106 (which may comprise file system 107 and database 108), and implementing the schema in the designated information warehouse 106. With current IW systems, such tasks are generally time-consuming and complex. It is desirable for the next generation IWMS to allow warehouse administrators (such as user 109) to build an information warehouse 106 in an easy, quick and flexible fashion without burdening the warehouse administrators 109 with the details of data warehouse models and database (file system) specific operations required, for example, to operate file system 107 and database 108.

Once an information warehouse 106 is defined, the next step is typically to load data into the warehouse 106 (e.g., perform loading data tasks 102). Loading data may be tightly related to the well-known ETL (i.e., extract, transform, load) process in that proper data fields need to be extracted, transformed, and loaded into the target information warehouse 106. Due to the requirements originating from unstructured data, the IWMS 100 may support flexible data extraction for various sources with different formats, such as XML files, sophisticated data transformations, and efficient loading mechanisms for large amounts of data. None of the prior art ETL tools known can handle the level of flexibility, complexity, and efficiency imposed by semi-structured data and unstructured data.

Because of the potential changes in information sources and the need for different types of analytics, an IWMS 100 in accordance with an embodiment of the present invention may allow flexible changes (e.g., perform maintaining data tasks 103) to information warehouse 106 while automatically maintaining the data consistency and integrity (e.g., data and their indices in RDBMS and full-text indices). Furthermore, IWMS 100 may provide, via maintaining data tasks 103, the ability to cope with various failure and error situations without requiring users 109 to rebuild information warehouse 106.

An IWMS 100 may support actions (e.g., perform cleaning data tasks 104) to clean the data already loaded in the information warehouse 106 or before the data are loaded. Such cleansing may include, for example, cleansing for structured, semi-structured, and unstructured data, e.g., changing and merging dimension values, coping with invalid XML files, and handling different character encodings.

Once the information warehouse 106 is built, it may be used to serve various forms of queries (e.g., perform querying data tasks 105). An IWMS 100 may support efficient processing of IW queries, e.g., OLAP operations, as well as text search and retrieval operations.

IWMS 100 may include a general and declarative high level language (GIWL) 110 to simplify and automate the IW tasks 101-105. With GIWL 110, users 109 may need only to specify what they want rather than how to execute the operations for performing tasks 101-105. An analogy, for example, is that of sequential query language (SQL) and its relationship to relational database management systems (RDBMS). With SQL, users 109 only need to define what they want in the query result rather than how to execute the query. The runtime system, e.g., information warehouse system 200 shown in FIG. 2, may handle the query automatically. Similarly, GIWL language 110 can be used to declaratively define various IW tasks (e.g., from among tasks 101-105). The runtime system, e.g., information warehouse system 200, may provide inherent support to carry out operations automatically without human intervention. Information warehouse system 200 may manage both structured and unstructured data. Information warehouse system 200 may use databases (such as database 108) to store and index structured data, and file systems (such as file system 107) or databases (such as database 108) for unstructured data. To support high performance and complex keyword queries, information warehouse system 200 may integrate with full text indexers (e.g., Juru and Lucence as known in the art) to automatically build indices for unstructured data. Information warehouse system 200 may maintain the data and index consistency between databases and file systems at all times.

Figure 2:
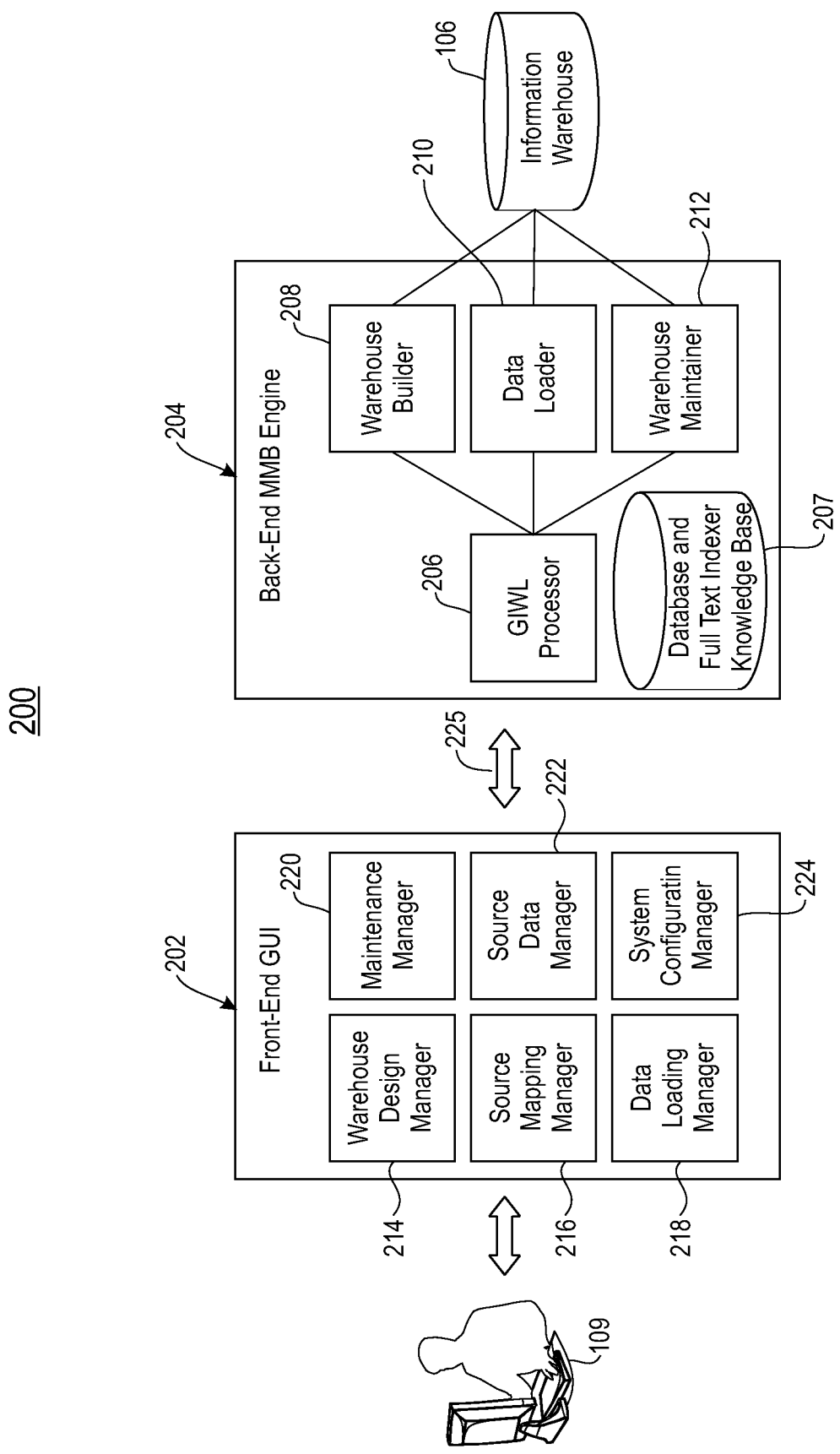
FIG. 2 is a system architecture diagram illustrating an information warehouse management system in accordance with an embodiment of the present invention.

The overall system architecture for information warehouse system 200 may contain the front-end GUI 202 and the back-end IWMS engine 204, as shown in FIG. 2. The back-end IWMS engine 204 may include a command line based GIWL processor 206 and its associated runtime modules, for example, the warehouse builder 208 for constructing the IW (e.g., performing building warehouse tasks 101), the data loader 210 for loading data (e.g., performing loading data tasks 102), and the warehouse maintainer 212 for IW maintenance (e.g., performing maintaining data tasks 103). The front-end GUI 202 may be a Web based graphical user interface for the back-end IWMS engine 204. GIWL processor 206 may employ input from database and full text indexer knowledge base 207 to generate commands for modules 208, 210, 212.

As seen in FIG. 2, the front-end GUI 202 may contain six modules: warehouse design manager 214, source mapping manager 216, data loading manager 218, maintenance manager 220, source data manager 222, and system configuration manager 224. The modules 214, 216, 218, 220 may generate GIWL commands for the IW building (e.g., tasks 101), schema-mapping and data loading (e.g., tasks 102), and IW maintenance (e.g., tasks 103) tasks. Such a front-end allows users to work with the information warehouse system 200 without even knowing the details of the GIWL language 110. A more intuitive GUI front-end 202 may automatically generate the appropriate GIWL scripts. The generated commands may be passed 225 to the back-end IWMS engine 204 for execution. The source data manager 222 may manage the source data. The system configuration manager 224 may manage and configure the IW settings, e.g., for information warehouse 106.

Figure 3:
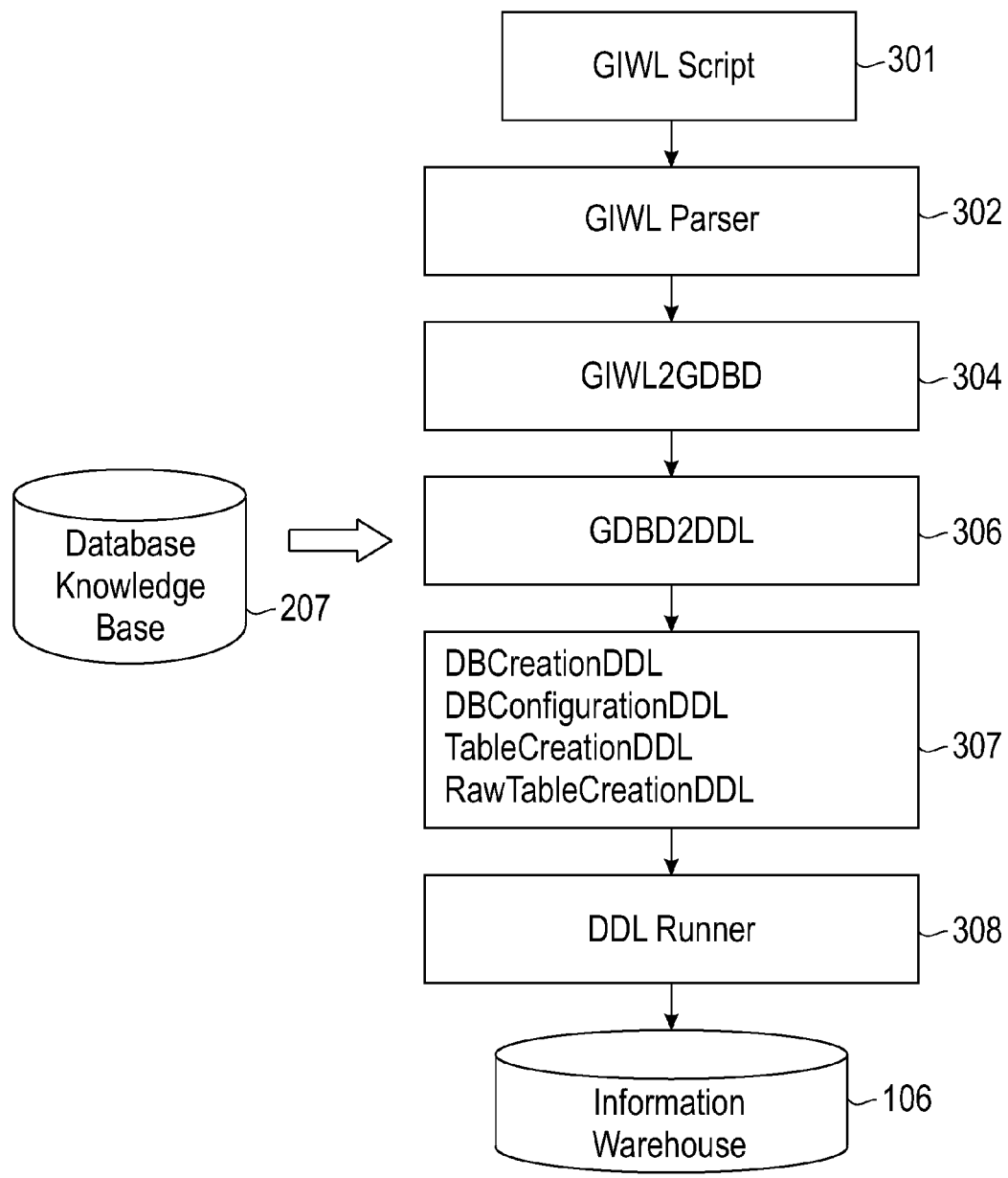
FIG. 3 is a system architecture diagram for information warehouse construction in accordance with one embodiment of the present invention.

FIG. 3 shows a high-level system architecture for an IW system 300 for IW construction (e.g., building warehouse tasks 101) using the GIWL language 110 and runtime components (e.g., information warehouse system 200). The input script 301 may be first parsed by the GIWL parser 302. The parser output 303 may go through the GIWL2GDBD module 304 which may generate database-independent designs (e.g., general database designs) for the tables and indices according to the script 301. The GDBD2DDL module 306 may then translate the general database designs from GIWL2GDBD module 304 into database-specific DDL (data description language) statements 307 for the user-selected target database by leveraging (e.g., using information from) a database knowledge base 207. The knowledge base 207 may contain database-specific parameters and settings that may be incorporated at runtime so that the DDL runner 308 can simply execute the database-specific DDL scripts 307 to construct the information warehouse 106.

Such a high-level system architecture for an IW system 300 may be extensible and support different databases while hiding the RDBMS details. Besides the fact and dimension tables, IW system 300 may also maintain several internal system tables to record the IW design. In particular, IW system 300 may record all the information about warehouses (i.e., warehouse names, their storage databases, their fact tables, dimension tables, dimension models, dimension attributes, attribute types and index types) in the internal system tables. In the IW construction phase (e.g., building warehouse tasks 101), file system storage and full text indexers may not be involved, but may play a role in the data loading stage (e.g., loading data tasks 102).

Figure 4:
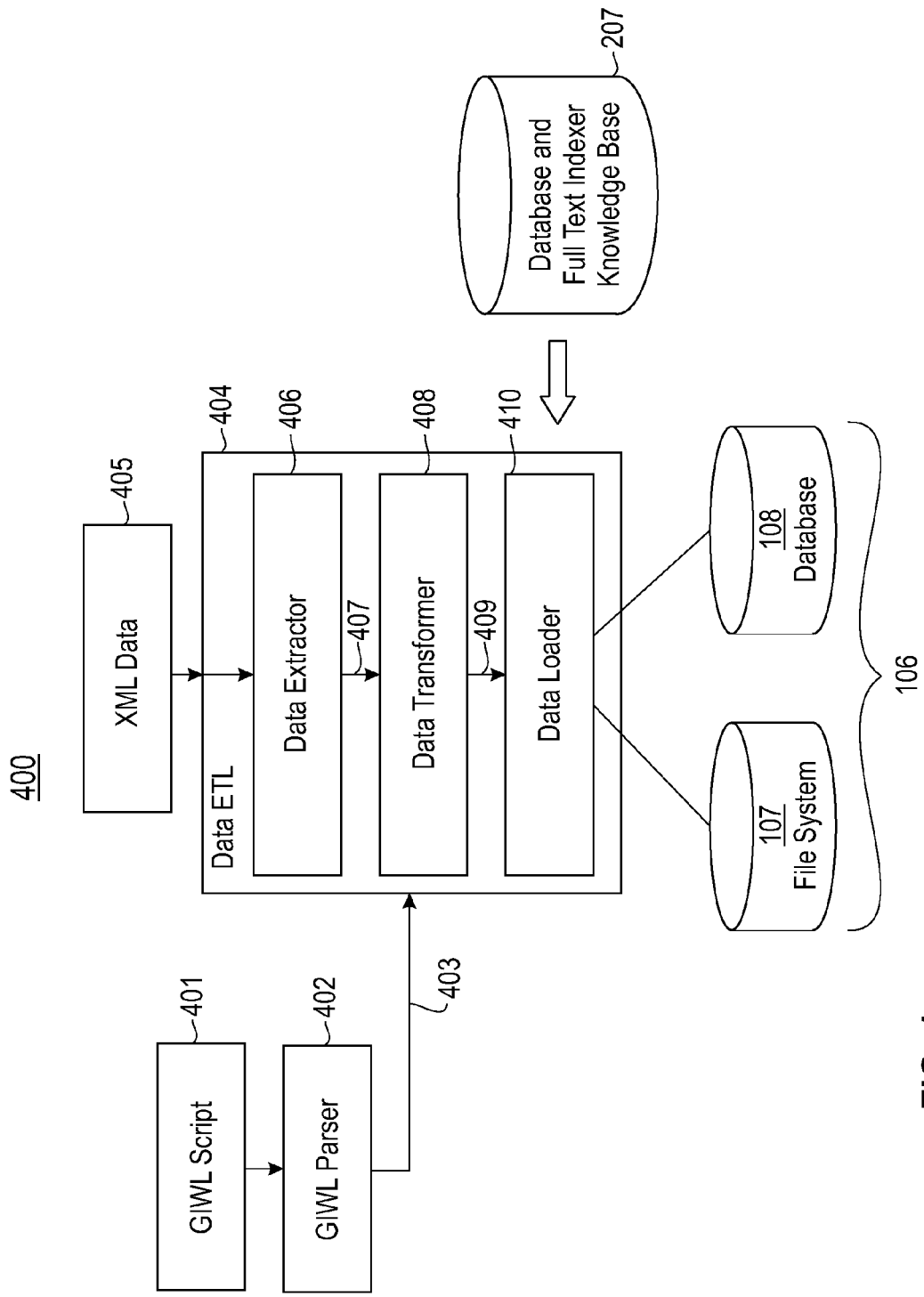
FIG. 4 is a system architecture diagram for information warehouse data loading in accordance with one embodiment of the present invention.

FIG. 4 shows a high-level system architecture for an IW system 400 for IW data loading (e.g., loading data tasks 102) using the GIWL language 110 and runtime components (e.g., information warehouse system 200). The input language script 401 may be parsed by the GIWL parser 402. The parsed output 403 may be fed into the data ETL component 404. The data extractor module 406 may extract the desired data from source data 405. For example, if source data 405 is an XML data source, data extractor module 406 may extract the desired XML data using an XML path language (XPath®) parser as known in the art. The data transformer module 408 may then transform the extracted data 407 into the target formats (e.g., data 409) according to the mapping profile (included, e.g., in parsed output 403 of GIWL parser 402). The data loader module 410 may load the data 409 into appropriate target IW tables and file system locations (e.g., in file system 107 and database 108 of information warehouse 106). The data loader module 410 may also build the appropriate indexes. Similar to the IW construction phase (e.g., tasks 101), the data loader 410 may first utilize generic database and full text indexing application programming interfaces (API) as much as possible and then customize the commands into database and full text indexer-specific commands according to the knowledge base inputs from knowledge base 207. To ensure fast data loading for large amounts of data, IW system 400 may also embed a set of performance enhancement techniques—such as a stream based XPath® parser and bulk loading into staging tables coupled with bulk population from the staging tables to the target IW tables. Such techniques may be critical for IW projects that may be loading large amounts of data (e.g., multiple gigabytes or terabytes (1,000 GB)) of data) on a regular basis.

Figure 5:
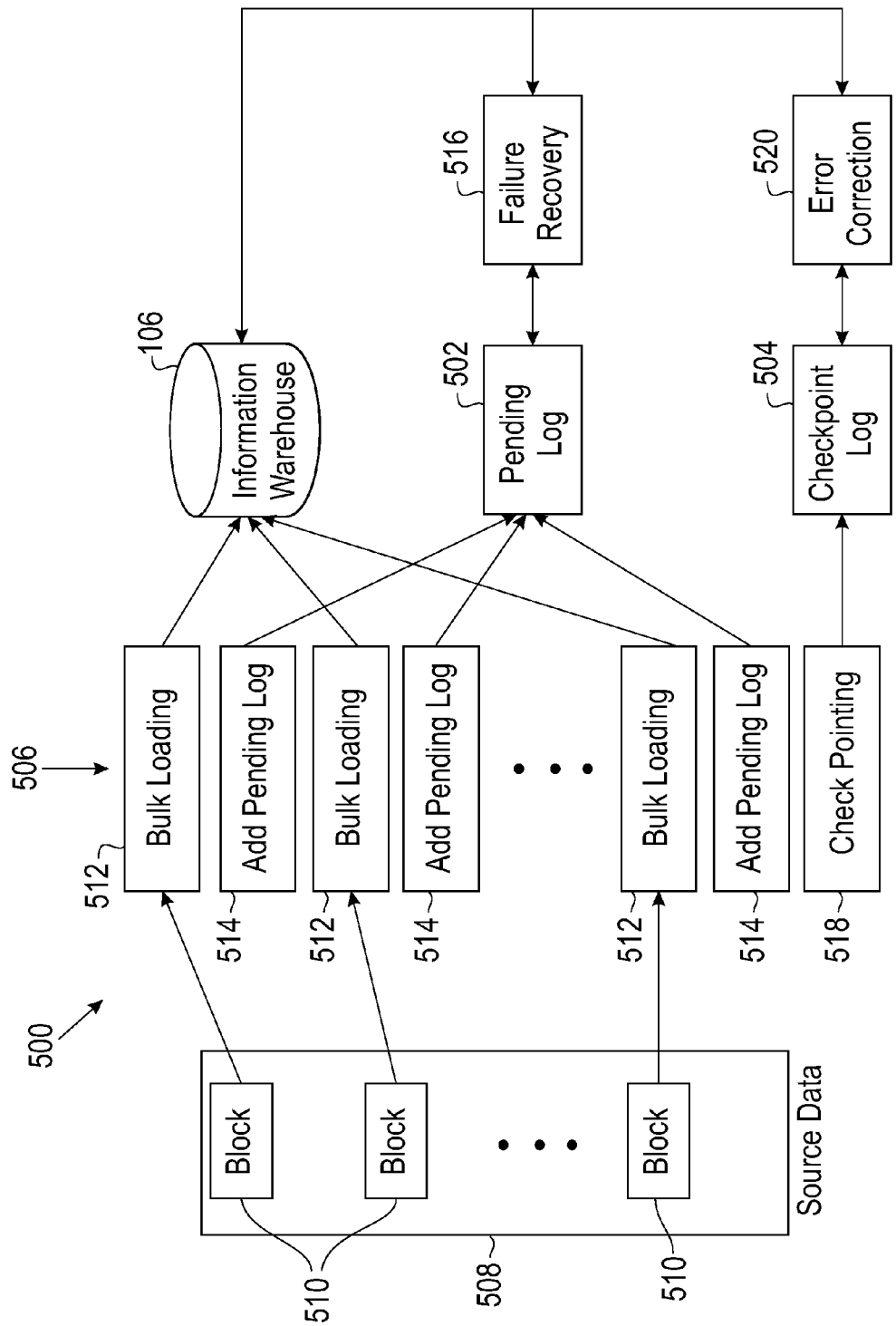
FIG. 5 is a system architecture diagram for information warehouse data maintenance in accordance with one embodiment of the present invention.

FIG. 5 shows a high-level system architecture for an IW system 500 for IW maintenance (e.g., maintaining data tasks 103) using the GIWL language 110 and runtime components (e.g., information warehouse system 200). To support proper IW maintenance, IW system 500 may utilize a set of pending logs 502 and checkpoint logs 504. Pending logs 502 may track the intermediate status of information warehouse 106 during data loading processes 506. They are used for failure recovery. Checkpoint logs record the IW status when data loads are completed. Pending logs 502 may be used for error correction. For a given source file 508, IW system 500 may split the source file 508 up into blocks 510 if the file 508 is very large. This is because current RDBMS systems often have limitations on how much data can be bulk loaded at a time (e.g., using bulk loading processes 512), and IW system 500 may utilize the existing RDBMS bulk loading capability for fast data loads. Before the source file 508 is fully loaded, its status may be set as pending (e.g., using add pending log processes 514). IW system 500 may bulk-load (e.g., using a bulk loading process 512) one block 510 at a time. After loading each block 510, IW system 500 may record the number of tuples loaded (e.g., using an add pending log process 514) in the pending logs 502. If the loading is interrupted, the failure recovery module 516 may uses the pending logs 502 to abort or resume the loading. After a source file 508 is fully loaded, IW system 500 may record a new checkpoint (e.g., using checkpointing process 518) into the checkpoint logs 504. The error correction module 520 may use the checkpoint logs to perform undo and redo actions on information warehouse 106. To support undo and redo operations, IW system 500 may use a versioning method to track different versions of the data 508 instead of physically deleting the records from the information warehouse 106. In other words, the versioning method, in contrast to typical prior art methods, does not delete previous versions of the record from the information warehouse 106, but rather, may add a version number to each record and determine for each record, using the record's version number, whether the record should be used as the current version of the record.

Figure 6:
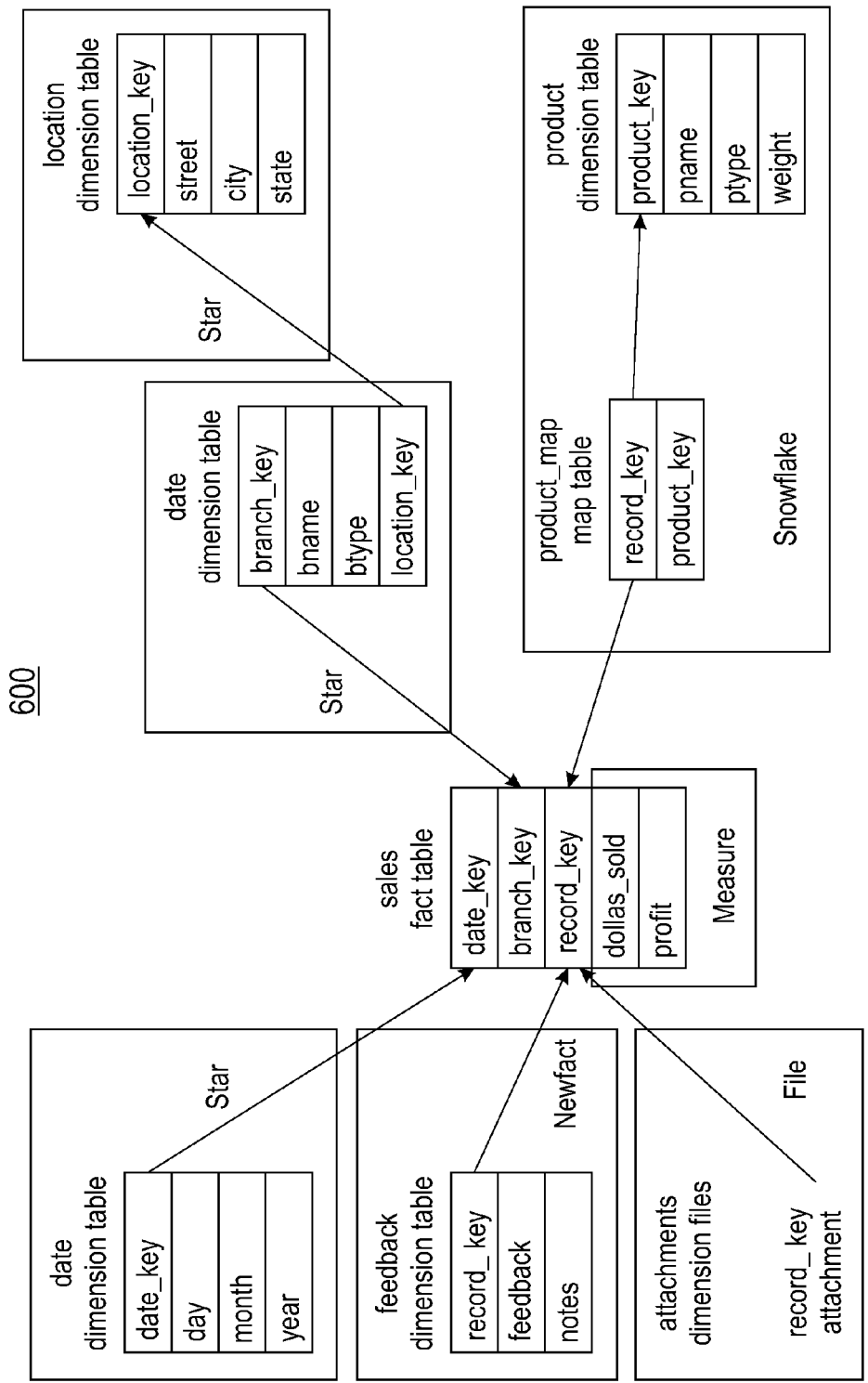
FIG. 6 is a structure diagram for an information warehouse example built in accordance with information warehouse construction of one embodiment of the present invention.

FIG. 6 illustrates an example of information warehouse construction in accordance with one embodiment of the present invention. A detailed description of the example illustrated by FIG. 6 may benefit from the following preliminaries.

One of the major issues with current information warehouse tools is that they are often system-dependent (as are, for example, DB2®, Oracle®, and SQL Server™). Current information warehouse tools typically require detailed RDBMS, IW modeling, and text indexing knowledge on the part of the user. Moreover, they often require highly skilled IW administrators to perform tedious, time-consuming, and error-prone customization when utilized in different customer environments. Such customizations may be necessary due to idiosyncrasy of different RDBMSs, file systems, and full-text indexers. Even though there are standards—such SQL for RDBMS and POSIX® for file systems—such standards often contain many non-standard variations, even for simple operations, which require customization at customer sites. The following examples may illustrate some variations in different relational database management systems. Such customization tasks can create barriers for timely information warehouse construction and may require significant training even for proficient DBAs.

EXAMPLE 1

Databases may use different keywords for defining the same data type. For instance, for the integer data type, DB20 uses "INTEGER" and MySQL® uses "INT"; for the large object data type (LOB), DB20 uses "CLOB (size)" and MySQL® uses "TINYBLOB", "BLOB", "MEDIUMBLOB", and "LONGBLOB".

EXAMPLE 2

Databases may have different ways to drop an index. For instance, in DB2®, Oracle® and PostgreSQL™, the syntax is "DROP INDEX index_name". In SQL Server™, however, the syntax is "DROP INDEX table_name.index_name". MySQL® uses "ALTER TABLE table_name DROP INDEX index_name".

EXAMPLE 3

Databases may have different ways to define automatically incremental attributes. For instance, in DB2®, the syntax is "NOT NULL GENERATED ALWAYS AS IDENTITY". In MySQL®, the syntax is "NOT NULL AUTO_INCREMENT". In SQL Server™, the syntax is "NOT NULL IDENTITY". Other databases may also have their own syntax.

EXAMPLE 4

Since creating (and dropping) databases are not supported in Java® database connectivity (JDBC) and open database connectivity (ODBC), to create (and drop) a database, one has to use database-specific command line utilities that are often different from one database to another. For instance, DB2® has its command line utility "db2", MySQL® has "mysql", and SQL Server™ has "sqlcmd". Each of the command line utilities just mentioned may have its own set of options to execute distinct from all the others.

Similar to the examples just given, full-text indexers are typically even less standardized than file systems and RDBMS systems. For example, building text indices may require users to link in very different libraries (e.g., Juru™ versus Lucene™). Also for example, in order to integrate structured and unstructured data in a single information warehouse, IW designers may need to be a highly skilled DBA, a data warehouse modeling expert, and a file system and full-text indexer expert. Such needs can create significant roadblocks for the adoption of IW, text mining, and BI technologies. Embodiments of the present invention may address such needs by utilizing a high level declarative language GIWL to clearly separate the high-level IW design and low-level IW implementation. Using IW system 300, for example, IW designers may design an information warehouse by creating a language script (such as language script 700 shown in FIG. 7) that contains a set of declarative statements defined in GIWL. The language script (e.g., language script 700) may indicate which database and full text indexer the user (e.g., user 109) wishes to use and what tasks need to be carried out. IW system 300 may, for example, automatically generate low-level database-specific and full-text indexer-specific commands at runtime based on the script and execute them without human (e.g., user 109) intervention. Such an approach may remove the customization burden from users (e.g., user 109) and enable overall IW task simplification and automation.

The following describes an exemplary detailed language specification for IW construction. The language specification for constructing an information warehouse may include two levels: an IW level and a dimension level. The IW level commands may define the language syntax at the granularity of entire information warehouses, such as creating, using, and dropping an information warehouse. The dimension level commands may define the language syntax at the granularity of facts and dimensions, such as creating, altering, and dropping a dimension. The concepts of facts and dimensions are well known in the art of data warehousing. In the language specification below, the lower-case words may indicate the command attributes that require user inputs and uppercase words may designate the command names.

IW Level Commands

To create an information warehouse, for example, "iw_name" in a database "db_name", use:
CREATE INFORMATION WAREHOUSE iw_name IN DATABASE db_name;
A single "db_name" database may hold multiple information warehouses.

To list all information warehouses on a database server, use:
SHOW INFORMATION WAREHOUSES;

To delete a specific information warehouse, for example, "db_name.iw_name", use:
DROP INFORMATION WAREHOUSE db_name.iw_name;

To use an existing information warehouse, use:
USE INFORMATION WAREHOUSE db_name.iw_name;

Dimension Level Commands

To set the name of the fact table, use:
SET FACT_TABLE=fact_table_name;

To create a dimension, having a name "dimension_name", for example, use:

```
CREATE DIMENSION dimension_name FIELDS(
    attribute_def, ..., attribute_def)
    MODEL USING [MEASURE | STAR | SNOWFLAKE |
    NEWFACT | FILE] ON [ FACT | dim_name];
attribute_def: attr_name TYPE [DATETIME | INT | BIGINT | FLOAT |
    VARCHAR (size) | CLOB (size) | ...]
    INDEX [NO | DB | TEXT];
```

To list all dimensions in an information warehouse, use:
SHOW DIMENSIONS;

To delete a dimension in an information warehouse, use:
DROP DIMENSION dimension_name;

Each dimension may consist of a set of attributes. Each attribute may be defined by a triplet: attribute name (e.g., attr_name), data type, and index type. Data types may include all standard types such as INT, BIGINT, FLOAT, DATETIME, VARCHAR, and CLOB. Index type can be an index in database or index in full text indexer, or no index. In addition, each dimension may require a schema model to be defined by the user (e.g., user 109). In one implementation, the schema model can be one of: MEASURE, STAR, SNOWFLAKE, NEWFACT, and FILE. A dimension can be associated with either the fact table or another dimension, which can be set using the "ON" keyword.

The above-named models are known in the data warehousing art and have conventional meanings. In order to support integration of structured and unstructured data, however, in one IWMS system, e.g., IW system 300, modifications may be given to the meanings as listed below so as to help simplify information warehousing tasks. Given the tradeoffs of different models and usage patterns, there may not be a single model that would fit all situations. Hence, supporting different models by IW system 300 may provide users with flexibility while still hiding the low-level system-specific details during model construction.

1. MEASURE: A dimension with the MEASURE model means that the attributes in this dimension may be put in the fact table. No new tables are created for this type of dimension. MEASURE model may only be meaningful when associating with the fact table. Hence, a dimension with the MEASURE model should always use "ON FACT" in the creation statement.

2. STAR: A dimension with the STAR model means that the primary key of this dimension may be a foreign key of the fact table or another dimension, depending on the setting of the "ON" keyword. Therefore, a traditional snowflake model can be constructed by using a sequence of STAR models in IW system 300.

3. SNOWFLAKE: A dimension, D, with the SNOWFLAKE model means this dimension may be linked to the fact table, F, or another dimension, D', through a map table, or named bridge table. The map table may describe the n:n relationship between D and F or D and D'.

4. NEWFACT: A dimension with the NEWFACT model means that the primary key of this dimension may also be the primary key of the fact table or another dimension it links to. The NEWFACT model may be needed for efficient incremental IW construction, such as adding new measure attributes or new attributes into existing dimensions after the IW has been constructed and data have been loaded. This model may be used to accommodate the RDBMS limitation on adding new columns for already constructed tables.

5. FILE: A dimension with the FILE model means that the dimension data may be stored in file systems instead of databases. Such a model may be designed to handle unstructured data. Although most databases also include text indexing and storage capabilities, such support in RDBMSs may typically be premature and unscalable to large amounts of unstructured data. On the other hand, file systems traditionally are more friendly to full-text indexers and storing unstructured data. In the FILE model, unstructured files may be directly associated with the primary key of the fact table.

FIG. 6 illustrates an example information warehouse 600 "sale" built by IW system 300. It contains different dimensions using all five models described above. FIG. 7 shows the GIWL language script used to generate the information warehouse 600 "sale". With such a script 700, IW system 300 may automatically generate database table and index designs, including all database and indexer specific details.

To construct an IW such as "sales", the following steps may be taken:

1. A user (e.g., user 109) may first use IW level commands to indicate the intention of creation of the warehouse "sale" as shown in FIG. 7.

2. The user may set the name of the fact table to be "sales" and create a set of dimensions. In the "sale" example, the user created a dimension "amount" with two measure attributes "dollars_sold" and "profit" in the fact table "sales". Both attributes need indexes in databases. The user also created a dimension "date" with the STAR model associated with "sales".

3. A dimension "branch" with the STAR model on "sales" is created.

4. A dimension "location" with the STAR model on "branch" is created. Note that the "location" dimension is traditionally considered as a snowflake model in the IW design. But in IW system 300, it is viewed as a STAR model for its directly linked dimension.

5. The user also created a dimension "product" with the SNOWFLAKE model on "sales". As a result, a table called product_map may be generated to connect the "product" table and the "sales" table.

6. A dimension "feedback" with the NEWFACT model on "sales" is also created. From FIG. 7, it can be seen that, although the attribute "feedback" may be stored in a database, its index can be built using a full text indexer.

7. The user created a dimension "attachments" with the FILE model, which uses file systems to store the attachment texts.

After the information warehouse (e.g., information warehouse 106) is constructed, data loading can begin, using, for example, IW system 400 shown in FIG. 4. Data loading typically requires users (e.g., user 109) to first specify how the source data (e.g., data 405) is mapped to the target IW schema before the data are loaded according to the mappings. Source-to-target mapping generally entails two tasks: data extraction (i.e., extracting pieces of data of interest from the source data) and data transformation (i.e., transforming the extracted data into appropriate formats and/or values for the target information warehouse). IW system 400 may be implemented, for example, to work with any XML formatted sources. XML may be selected to illustrate the present examples because XML is commonly used and also may represent a combination of structured and unstructured data. That is, XML data typically contains both structured fields as well as unstructured texts. XML data may also have a complex schema model. Loading data using IW system 400 may entail separate requirements for data extraction, data transformation, and data loading.

Data Extraction: Typically, to support analytics applications, only a subset of the source data fields needs to be populated into the target information warehouse. Thus, the data extraction mechanism may desirably be flexible to allow accurate extraction of the desired source data fields from source data. For XML data, for example, this may be especially challenging due to XML data's highly flexible formats. For instance, exactly the same data content can be organized very differently in XML format as shown in FIG. 8.

Each of segments (1) through (4) shown in FIG. 8, although having very different document type definitions (DTD), contains the same data content (i.e., the first and last names of two authors: "Jim Gray" and "Jeffrey Ullman"). Yet, some of the segments put data as text values (i.e., segments (1) and (4)) while others as put data attribute values (i.e., segments (2) and (3)). Some of the segments put last name and first name as tag names (i.e., segment (1)), while other segments put last name and first name as attribute names (i.e., segment (2)) or attribute values (i.e., segments (3) and (4)).

To resolve the issues described above, IW system 400 may use XPath® to locate the desired data fields. For the examples shown in FIG. 8, the xpath to locate the article nodes is "/doc/article". Assuming that users would like to retrieve fields for each article, and given an article node context, the xpath to locate all the authors in segments (1), (2), (3) is "./author", while the xpath to locate all the authors in segment (4) is "./item[@attr='author' ]". Given an author node context, the xpaths to locate the value of the first name in these four segments are, respectively:

"./fname/text( )",
"self::node( )/@fname",
"./item[@attr='fname']/- @value", and
"./item[@attr='fname']/text( )".

Such record and attribute location capabilities can be modified and extended to support locating records and attributes in RDBMS or delimited files as well.

Data Transformation: The extracted data (e.g., extracted data 407 shown in FIG. 4) sometimes requires transformation before it can be inserted into the target information warehouse, e.g., transforming a "date" value from "yyyy-mm-dd" format to "mm/dd/yyyy", or selecting a substring from the data value. IW system 400 may support such transformations by providing a common set of transformation functions as well as user defined functions.

Figure 9:
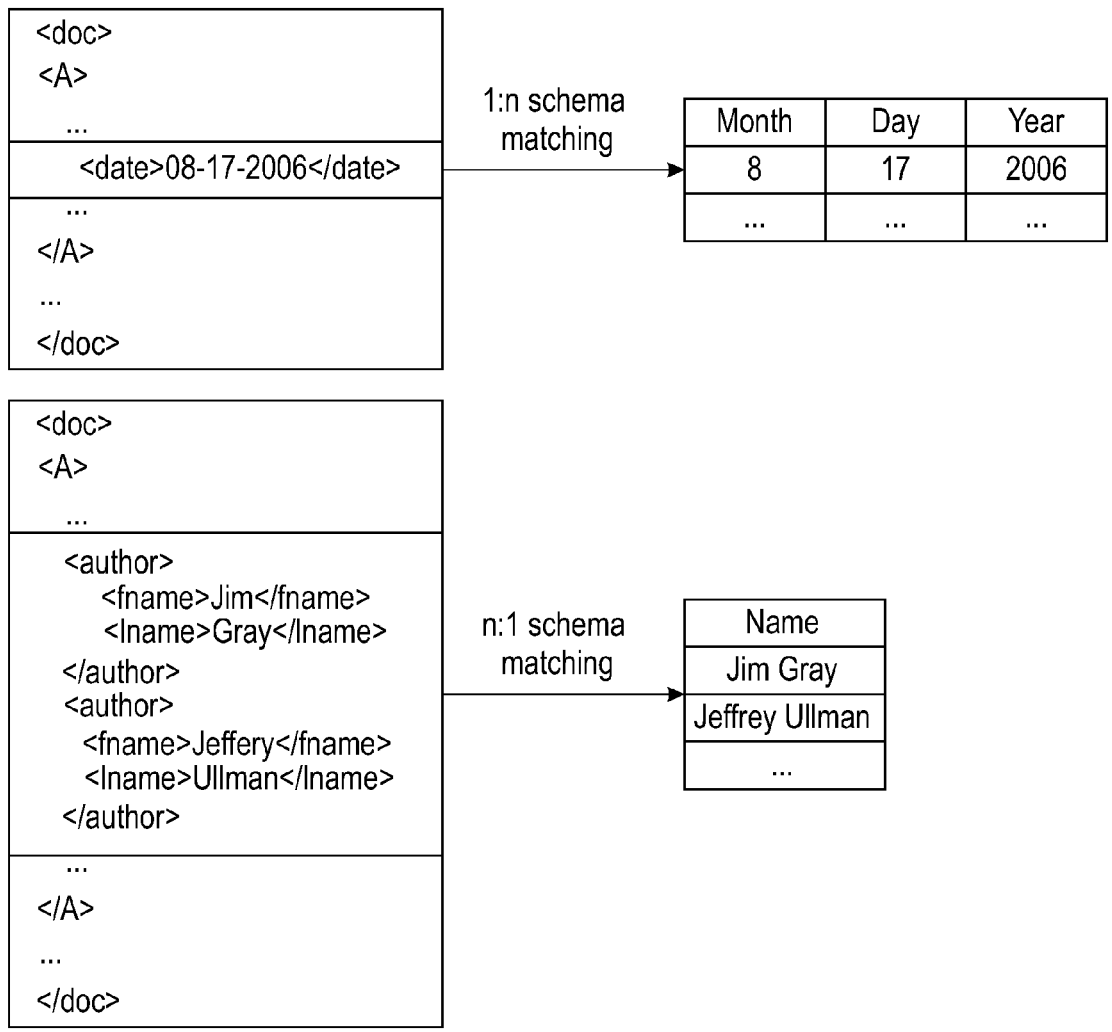
FIG. 9 is a matching diagram showing an example of source-to-target complex schema matching according to an embodiment of the present invention.
Figure 10:
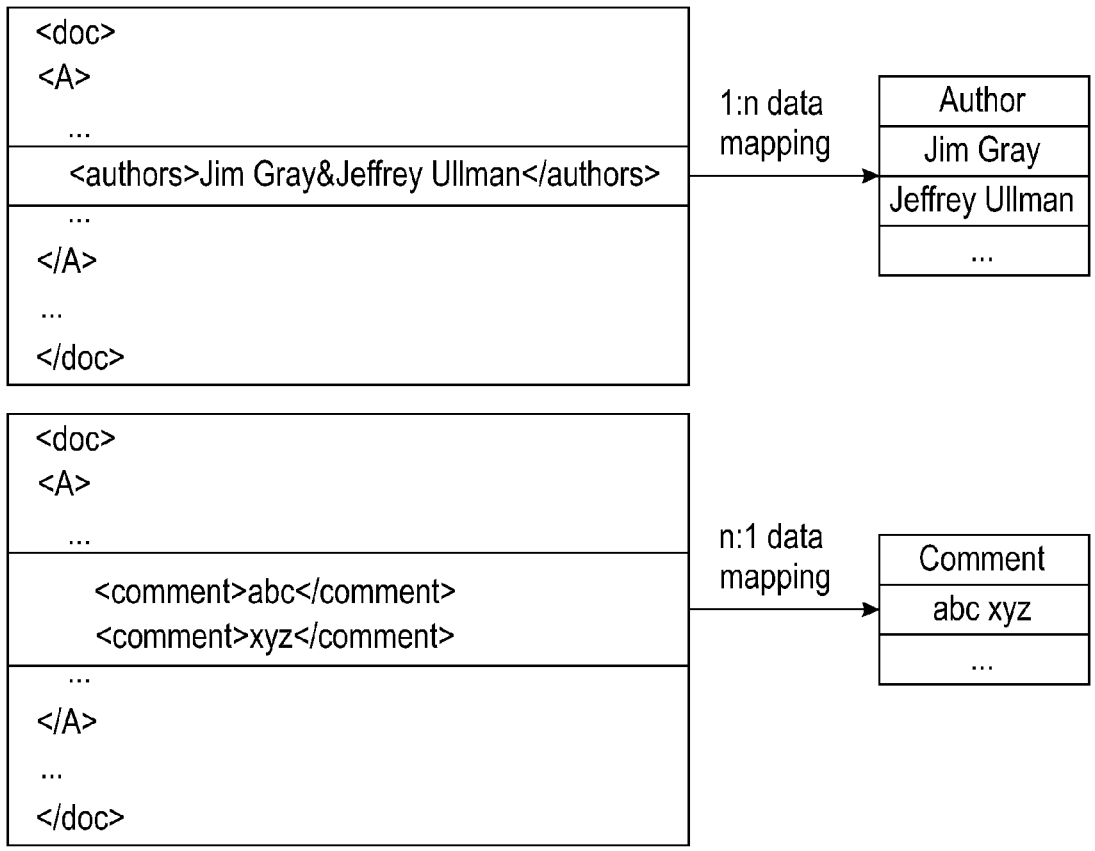
FIG. 10 is a mapping diagram showing an example of source-to-target complex data value mapping according to an embodiment of the present invention.

In addition to data format transformations, an ETL process for information warehouse should also provide two common, but more complex transformations, e.g., source-to-target complex schema matching and complex data value mapping, as shown in FIG. 9 and FIG. 10.

FIG. 9 shows an example of source-to-target complex schema matching. The first scenario (top arrow in FIG. 9) may be 1:n schema matching, which means one attribute may be matched into multiple attributes in a dimension. For example, the 1:n schema matching may be from date to month, day, and year. The second scenario (bottom arrow in FIG. 9) may be n:1 schema matching, which may match multiple attributes into one attribute in a dimension. For example, the n:1 schema matching may be combining last name and first name into a name attribute.

FIG. 10 shows an example of source-to-target complex data value mapping. The first scenario (top arrow in FIG. 10) may be a 1:n data value mapping, which may split the source data value into multiple data values in a dimension in the target information warehouse. For example, data value mapping may be from "Jim Gray&Jeffrey Ullman" to "Jim Gray" and "Jeffrey Ullman". The second scenario (bottom arrow in FIG. 9) may be an n:1 data value mapping, which may combine multiple data values into one value in a target dimension. For example, data value mapping may be from "abc" and "xyz" to "abc xyz".

Data Loading: Once the desired data fields have been extracted and (possibly) transformed, data loading (e.g., processing by data loader 410 on data 409 as shown in FIG. 4) may begin. Data loading may be required to ensure proper maintenance of the data relationships, for example, those existing in the source data 405. That is, if two attributes $A_1$ and $A_2$ have certain dependencies in the source data (e.g., source data 405), such dependencies may be required to be maintained in the target information warehouse (e.g., information warehouse 106) as well. Similarly, if two attributes $A_1$ and $A_2$ are independent in the source data, it may be required that they be so in the target information warehouse. FIG. 11 shows different data relationships for three seemingly similar XML segment examples (1), (2), and (3). All three examples of FIG. 11 assume that users (e.g., user 109) would like to create a dimension with two columns, B and C. In segment (1), the values of tags B and C are independent. In segment 2, B and C are grouped together at all times. Segment 3 also has B and C grouped together, but within each group, their values are independent. Such groupings indicate that the data loading results for the dimension table that contains B and C may be different in each case (1), (2), and (3), as shown in FIG. 11.

The following describes an exemplary detailed language specification for IW loading data. To handle both structured and unstructured data in file systems and databases, IW system 400 may provide a set of high level GIWL commands for data loading tasks while hiding the extraction, transformation and loading details from users (e.g., user 109). The language specification for loading data may contain two main categories: source mapping commands and data loading commands. The source mapping commands may define the language syntax for data extraction and data transformation. The data loading commands may define the language syntax for data loading.

Source Mapping Commands

To create a mapping profile, for example, "profile_name", use:
   CREATE MATCHING PROFILE profile_name;
A mapping profile may contain a set of mappings.
   To set the path of a record in a profile, use:

```
SET RECORD_PATH = "xpath:a_xpath"
      IN profile_name;
```

A record may be defined as a unit of entity that is to be inserted into the target information warehouse, such as a document and all of its associated metadata fields. The record may correspond to a record in the fact table of the information warehouse. This set the path of a record command may set the xpath to the record nodes.

To add mappings for a dimension into a profile, use:

```
CREATE MATCHING IN profile_name
      FOR DIMENSION dimension_name FIELDS(
         mapping_def, ..., mapping_def);
   mapping_def: attr_name FROM
         attr_path, ..., attr_path
         FUNCTION a_func
   attr_path: "xpath:a_xpath"
```

This command may create all the mappings from the source data to the target attributes of a dimension. The attribute name in the dimension may be specified by "attr_name". The source data fields may be expressed using a set of xpaths. The data transformation may be defined by the "FUNCTION" keyword. A function may be defined in a nested way, i.e., a function can contain other functions.

To list all the profiles, use:
SHOW MATCHING PROFILES;
To list all the mappings in a profile, use:
SHOW MATCHINGS IN profile_name;
To delete a profile, use:
DROP MATCHING PROFILE profile_name;
To remove mappings for a dimension from a profile, use:

```
DROP MATCHING FROM profile_name
      FOR DIMENSION dimension_name;
```

Data Loading Commands
   To load a source data file, use:

```
LOAD FILE file_name
      USING PROFILE profile_name;
```

To load a directory of files, use:

```
LOAD DIR dir_name
      USING PROFILE profile_name;
```

Table 1 illustrates a data loading example using an information warehouse, "example". Assuming that the XML data (e.g., source data 405) contains all the attributes used in FIGS. 9 and 10, the script (e.g., script 410) shown in Table 1 may first create a mapping profile "mth" and set the xpath of all the records to be "/doc/A" which may locate all document records to be loaded. The script of Table 1 may then create a set of mappings. For example, there may be three sample mappings to the value dimension: value1 may contain an xpath, value2 may contain a data transformation function "Substring", and value3 may contain nested functions. The question mark in the function may be used to represent the values extracted from the xpath.

The example script of Table 1 also shows a dimension with 1:n schema mapping for the "date dimension". In this example, a 1:n schema mapping may be decomposed into n individual simple mappings, where each mapping utilizes the function "SplitSelect" to split and select the desired portions of data. The reverse, i.e., a dimension with an n:1 schema mapping, is illustrated in Table 1 using the "name" dimension, where multiple xpaths may be used to specify the desired data, e.g., the first name and last name and the function "Concat" concatenates them for the target field in the dimension, where "?1" denotes the extracted data from the first xpath and "?2" extracted data from the second xpath. Similar to schema matching, Table 1 shows two data mapping examples, i.e., 1:n data mapping for the "author" dimension and n:1 data mapping for the "comment" dimension. The 1:n data mapping may use the function "Split", for example, to split the data value into multiple data values, and the n:1 data mapping may use the function "Merge", for example, to merge multiple data values into one value. The LOAD command may load the XML data file "data.xml" according to the mapping profile "mth".

TABLE 1

GIWL script for loading data into a data warehouse "example".

USE DATA WAREHOUSE demo.example;
CREATE MATCHING PROFILE mth;
SET RECORD_PATH = "xpath:/doc/A" IN mth;
/* simple matchings */
CREATE MATCHING IN mth FOR DIMENSION value FIELDS (
value1 FROM "xpath:./value1/text( )",
value2 FROM "xpath:./value2/text( )" FUNCTION Substring(?, 3, 9),
value3 FROM "xpath:./value3/text( )" FUNCTION
ToUpperCase(Substring(?, 5)));
/* 1-to-n complex schema matching */
CREATE MATCHING IN mth FOR DIMENSION date FIELDS (
month FROM "xpath:./date/text( )" FUNCTION SplitSelect(?, "-", 1),
day FROM "xpath:./date/text( )" FUNCTION SplitSelect(?, "-", 2),
year FROM "xpath:./date/text( )" FUNCTION SplitSelect(?, "-", 3));
/* n-to-1 complex schema matching */
CREATE MATCHING IN mth FOR DIMENSION name FIELDS (
name FROM "xpath:./author/fname/text( )", "xpath:./author/lname/text( )"
FUNCTION Concat(?1, " " ?2));
/* 1-to-n complex data matching */
CREATE MATCHING IN mth FOR DIMENSION author FIELDS (
author FROM "xpath:./authors/text( )" FUNCTION Split(?, "&"));
/* n-to-1 complex data matching */
CREATE MATCHING IN mth FOR DIMENSION comment FIELDS (
comment FROM "xpath:./comment/text( )" FUNCTION Merge(?, " "));
LOAD data.xml USING PROFILE mth;

After the information warehouse (e.g., information warehouse 106) is constructed and loading data completed, IW maintenance may be performed, using, for example, IW system 500 shown in FIG. 5. IW system 500 may provide two key types of maintenance capabilities, e.g., the ability to efficiently recover from data loading failures and the ability to correct data errors efficiently. Without such capabilities, failures or errors occurring in a lengthy data load typically result in complete IW reloads. Even if DBAs would manually clean up the failed loads, there is often a danger of breaking the overall IW data integrity and consistency in such manual processes.

Failure recovery may describe a situation where a data loading (e.g., data loading 506) may fail due to unexpected system errors, e.g., machine or network crash, and an IWMS must properly clean up the incomplete records from the information warehouse and be able to resume loading data from where it was left off without breaking data integrity and consistency. To cope with such situations, two logical actions, "abort" and "resume", may be provided, for example, by IW system 500. Similar to the transaction rollback concepts in databases (e.g., RDBMS), "abort" may roll the IW state (of information warehouse 106, for example) back to a consistent state before the failure point. Likewise, "resume" may allow users (e.g., user 109) to resume the failed data load from that last consistent state without reloading everything from scratch. No known prior art RDBMS has readily available support for such failure recovery operations. Yet, "abort" and "resume" may be extremely important for an IW environment, and "abort" and "resume" may also be useful when users intentionally wish to abort a data load.

Error correction may describe a situation where the data (e.g., source data 508) may be loaded successfully but users may find errors in some loaded data content in the information warehouse (e.g., information warehouse 106) and hence wish to revert some portion of the data load and reload some of the data using corrected contents. To allow flexible error corrections for the loaded data, IW system 500 may support "undo" and "redo" operations. Such "undo" and "redo" operations may also be used to facilitate data modifications.

The following describes an exemplary detailed language specification for IW maintenance. Similar to other IW activities, IW system 500 may contain a set of high level GIWL commands to handle failure recovery and a set of high level GIWL commands to handle error correction cases. The IW system 500 may automatically (e.g., hiding system operational details from users 109) recover from the failed and erroneous situations as described below.

Failure Recovery Commands

To abort a failed data loading of a source file, for example, "src_name", use:
  ABORT LOADING src_name;
Here src_name is the name of the source file being loaded.
  To list all aborted loads, use:
  SHOW PENDING LOADINGS;
Loading resumption may be done implicitly when users (e.g., user 109) issue the LOAD command (e.g., shown above under the heading "Data Loading Commands"). IW system 500 may automatically resume the loading from the last consistent break point (e.g., checkpoint defined during data loading).

Error Correction Commands

To list all loaded source files in the loading order, use:
  SHOW LOADED SOURCES;
  To undo the load of a source file, for example, "src_name", use:
  UNDO src_name;
This command may undo the loading of the source file "src_name".
  To undo loadings down to a particular source file, use:
  UNDO UNTIL src_name;
This command may undo all the loaded source files until the source file "src_name". (The source file "src_name" may also be included in the undo action.)
  To undo all the loaded source files, use:
  UNDO ALL;
This command may empty the information warehouse.

To list all the source files that can be redone, use:
SHOW REDOABLE SOURCES;
This command may list all the source files that have no changes after being undone and thus are redoable.

To redo loadings to a particular source file, use:
REDO src_name;
This command will redo the loading of the source src_name.

To redo loadings up to a particular source file, for example, "src_name", use:
REDO UNTIL src_name;
This command may redo loadings of all the source files until the source file "src_name". (The source file "src_name" may also be included in the redo action.)

Figure 12:
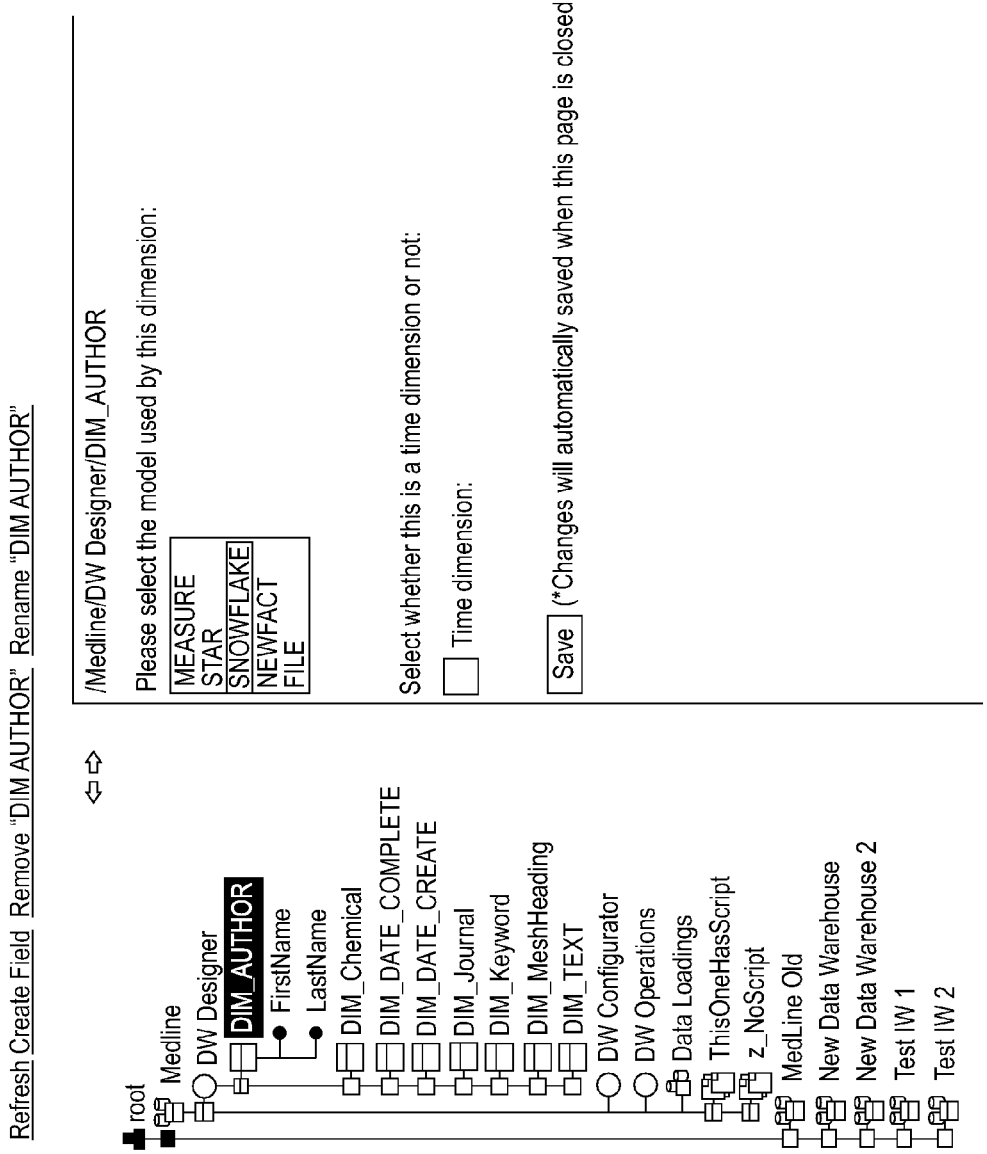
FIG. 12 is a screenshot illustrating an example of designing a data warehouse dimension using a warehouse design manager of a front end graphical user interface (GUI) in accordance with an embodiment of the present invention.

FIG. 12 shows a screen snapshot for the front-end GUI 202, illustrating an example of designing a data warehouse dimension using a warehouse design manager. As shown in FIG. 12, the left panel shows how the GUI may organize information warehouses in a tree structure. Under each information warehouse in the left panel may be included a DW (data warehouse) designer, DW configuration, and a set of mapping profiles. FIG. 12 shows what may be a screen for the dimension design. For the example illustrated by FIG. 12, when a user (e.g., user 109) chooses the dimension "DIM_Author" in the left panel, the right panel may display the schema model of the "DIM_Author" dimension. The top portion of the screen may show a list of operations available for the chosen dimension, such as create an attribute and remove the dimension.

Figure 13:
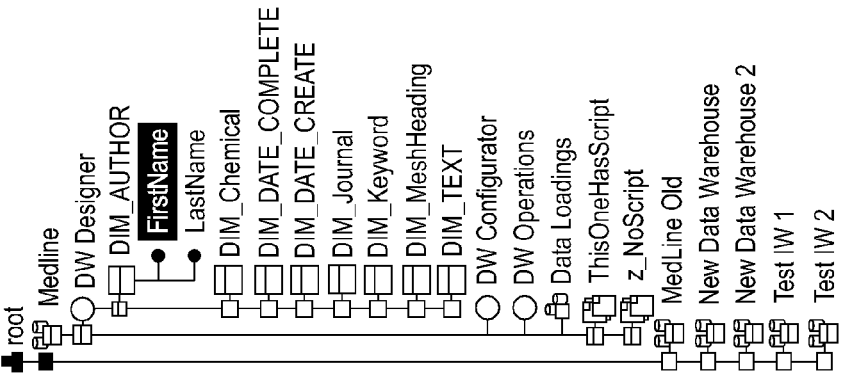
FIG. 13 is a screenshot illustrating an example of designing a data warehouse attribute using a warehouse design manager of a front end graphical user interface in accordance with an embodiment of the present invention.

FIG. 13 shows a screen snapshot of the front-end GUI 202 interface for attribute design illustrating an example of designing a data warehouse attribute using a warehouse design manager. When a user (e.g., user 109) chooses the attribute "FirstName" in the dimension "DIM_Author" in the left panel, the right panel may display the attribute type, data length, and index information, as shown in FIG. 13. The top portion of the screen may show the available operations for this attribute, such as remove and rename the attribute.

Figure 14:
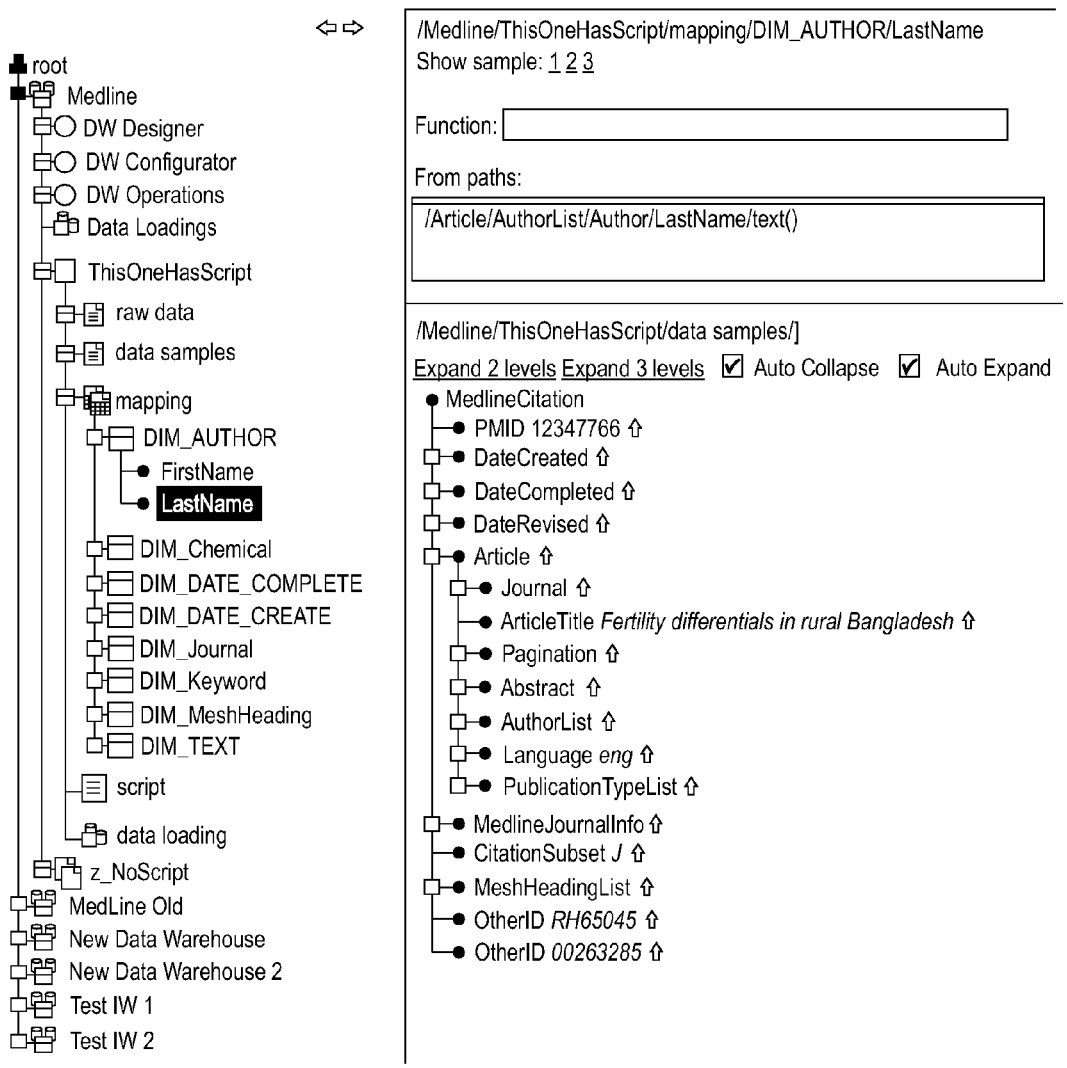
FIG. 14 is a screenshot illustrating an example of specifying a source mapping using a source mapping manager of a front end graphical user interface in accordance with an embodiment of the present invention.

FIG. 14 shows a screen snapshot of the front-end GUI 202 illustrating an example of specifying a source mapping using a source mapping manager. The left panel of FIG. 14 illustrates an example for specifying the mapping for the attribute "LastName" in dimension "DIM_Author" under one mapping profile. The right panel shows the input XML schema structure with some sample data. A user (e.g., user 109) may choose the data of interest by browsing the structure and data in the right panel. The front-end interface 202 may derive corresponding xpaths automatically.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A method for information warehouse construction in memory of a hardware computer processor, comprising:

accepting input from a user at a front-end graphical user interface;

generating a plurality of commands employing declarative statements in an information warehouse language and performing loading or copying of data using:

information warehouse (IW) level commands that when implemented provide support for both structured and unstructured data, indexing engine level commands configured to perform tasks specified by the commands from a user interface, source mapping commands configured to perform at least one of: a data format transformation, source-to-target complex schema matching, and complex data value mapping, data loading commands configured to perform at least one of: a data format transformation, source-to-target complex schema matching, and complex data value mapping, and dimension level commands that when implemented provide support for both structured and unstructured data and include at least one of: creating a dimension, altering the dimension, and dropping the dimension; and constructing an information warehouse based on a script comprising the IW level commands and the dimension level commands according to the language specification for information warehouse construction; and providing error correction for data loaded from a source file into the information warehouse using:

an abort command that uses a pending log to return the information warehouse to a consistent break point prior to a data load into the information warehouse so that operational details of maintaining data integrity for both the structured and the unstructured data are hidden from a user of the abort command, such that a load command automatically resumes loading data into the information warehouse from a last consistent breakpoint of a data load, while maintaining data integrity for both the structured and the unstructured data by performing system level tasks that are hidden from a user of the load command;

an undo command, operating with regard to the source file, that uses a checkpoint log to automatically return the information warehouse to a state of the information warehouse prior to loading of the source file, while maintaining data integrity for both the structured and the unstructured data by performing system level tasks that are hidden from a user of the undo command; and a redo command, operating with regard to the source file, that uses the checkpoint log to automatically return the information warehouse to a state of the information warehouse after loading of the source file, wherein the loading of the source file has previously been undone, and while maintaining data integrity for both the structured and the unstructured data by performing system level tasks that are hidden from a user of the redo command.

2. The method of claim 1, wherein the IW level commands define a language syntax at the granularity of the information warehouse, wherein system and database level tasks required to perform the commands are transparent to a user of the IW level commands.

3. The method of claim 1, wherein the dimension level commands define a language syntax at the granularity of facts and dimensions, wherein system and database level tasks required to perform the commands are transparent to a user of the dimension level commands.

4. The method of claim 1, wherein the IW level commands include commands for creating the information warehouse, using the information warehouse, and dropping the information warehouse.

5. A method for data loading in an information warehouse stored in memory of a hardware computer processor ,comprising:

accepting input from a user at a front-end graphical user interface;

generating a plurality of commands employing declarative statements in an information warehouse language and performing loading or copying of the data using:
information warehouse (IW) level commands that when implemented provide support for both structured and unstructured data,
indexing engine level commands,
dimension level commands that when implemented include at least one of: creating a dimension, altering a dimension, and dropping the dimension, and provide support for both structured and unstructured data,
source mapping commands configured to perform at least one of: performing a data format transformation, performing source-to-target complex schema matching, and performing complex data value matching, and
data loading commands configured to perform at least one of: performing a data format transformation, performing source-to-target complex schema matching, and performing complex data value matching;

loading data into an information warehouse based on a script including both the source mapping commands and the data loading commands according to the language specification for data loading; and providing error correction for data loaded from a source file into the information warehouse according to at least one of: the information warehouse level commands, the dimension level commands, the source mapping commands and the data loading commands, an abort command that uses a pending log to return the information warehouse to a consistent break point prior to a data load into the information warehouse so that operational details of maintaining data integrity for both the structured and the unstructured data are hidden from a user of the abort command, such that a load command automatically resumes loading data into the information warehouse from a last consistent breakpoint of a data load, while maintaining data integrity for both the structured and the unstructured data by performing system level tasks that are hidden from a user of the load command;

an undo command, operating with regard to the source file, that uses a checkpoint log to automatically return the information warehouse to a state of the information warehouse prior to loading of the source file, while maintaining data integrity for both the structured and the unstructured data by performing system level tasks that are hidden from a user of the undo command; and a redo command, operating with regard to the source file, that uses the checkpoint log to automatically return the information warehouse to a state of the information warehouse after loading of the source file, wherein the loading of the source file has previously been undone, and while maintaining data integrity for both the structured and the unstructured data by performing system level tasks that are hidden from a user of the redo command.

6. The method of claim 5, wherein the source mapping commands and data loading commands define a language syntax wherein system and database level tasks required to perform the commands are transparent to a user of the source mapping commands and data loading commands.

7. The method of claim 5 wherein implementing the source mapping commands and data loading commands includes performing a data extraction using an xpath to locate a desired data field.

8. A method for data maintenance of an information warehouse stored in memory of a hardware computer processor, comprising:

providing a language specification for information warehouse (IW) maintenance in the information warehouse;

accepting input from a user at a front-end graphical user interface;

generating a plurality of commands employing declarative statements in an information warehouse language and performing loading or copying by:
implementing indexing engine level commands configured to perform tasks specified by the commands from an interface;
implementing dimension level commands that when implemented provide support for both structured and unstructured data and include at least one of: creating a dimension, altering the dimension, and dropping the dimension;
implementing IW level commands that when implemented provide support for both structured and unstructured data;
implementing source mapping commands configured to perform at least one of: a data transformation, source-to-target complex schema matching, and complex data value mapping; and
implementing data loading commands configured to perform at least one of: a data format transformation, source-to-target complex schema matching, and complex data value mapping; and performing an IW maintenance operation on the information warehouse based on a script including at least one of failure recovery commands, error correction commands according to the language specification for IW maintenance, an abort command that uses a pending log to return the information warehouse to a consistent break point prior to a data load into the information warehouse so that operational details of maintaining data integrity for both structured and unstructured data are hidden from a user of the abort command, such that a load command automatically resumes loading data into the information warehouse from a last consistent breakpoint of a data load, while maintaining data integrity for both the structured and the unstructured data by performing system level tasks that are hidden from a user of the load command, an undo command, operating with regard to a source file, that uses a checkpoint log to automatically return the information warehouse to a state of the information warehouse prior to loading of the source file, while maintaining data integrity for both the structured and the unstructured data by performing system level tasks that are hidden from a user of the undo command, and a redo command, operating with regard to the source file, that uses the checkpoint log to automatically return the information warehouse to a state of the information warehouse after loading of the source file, wherein the loading of the source file has previously been undone, and while maintaining data integrity for both the structured and the unstructured data by performing system level tasks that are hidden from a user of the redo command.

9. The method of claim 8, wherein the failure recovery commands and error correction commands define a language syntax wherein system and database level tasks required to perform the commands are transparent to a user of the failure recovery commands and error correction commands.

10. An information warehouse system comprising:
a hardware computer processor including memory;
a front-end graphical user interface that accepts inputs from a user and generates a plurality of commands employing declarative statements in an information warehouse language;
an information warehouse language processor stored on the memory that receives a plurality of user interface commands from the user interface and performs loading using at least one of:
system level commands;
database level commands that when implemented provide support for both structured and unstructured data;
indexing engine level commands configured to perform tasks specified by the commands from the interface;
source mapping commands configured to perform at least one of: a data transformation, source-to-target complex schema matching, and complex data value mapping;
data loading commands configured to perform at least one of: a data format transformation, source-to-target complex schema matching, and complex data value mapping; and
dimension level commands that when implemented provide support for both structured and unstructured data and include at least one of: creating a dimension, altering the dimension, and dropping the dimension;

a warehouse builder that:
receives the at least one of: the system level commands, the database level commands, and the indexing engine level commands;
performs tasks specified by the at least one of system level, database level, and indexing engine level commands;
builds an information warehouse; and
provides error correction for data loaded from a source file into the information warehouse using:
an abort command that uses a pending log to return the information warehouse to a consistent break point prior to a data load into the information warehouse so that operational details of maintaining data integrity for both the structured and the unstructured data are hidden from a user of the abort command, such that a load command automatically resumes loading data into the information warehouse from a last consistent breakpoint of a data load, while maintaining data integrity for both the structured and the unstructured data by performing system level tasks that are hidden from a user of the load command;
an undo command, operating with regard to the source file, that uses a checkpoint log to automatically return the information warehouse to a state of the information warehouse prior to loading of the source file, while maintaining data integrity for both structured and unstructured data by performing system level tasks that are hidden from a user of the undo command; and
a redo command, operating with regard to the source file, that uses the checkpoint log to automatically return the information warehouse to a state of the information warehouse after loading of the source file, wherein the loading of the source file has previously been undone, and while maintaining data integrity for both the structured and the unstructured data by performing system level tasks that are hidden from a user of the redo command.

11. The system of claim 10, further comprising:
a data loader that receives the at least one of: system level, database level, and indexing engine level commands from the information warehouse language processor and performs tasks specified by the at least one of: system level, database level, and indexing engine level commands to load data from a source file into the information warehouse according to the commands from the at least one of: user interface, the system level, database level, and indexing engine level commands being hidden from the user.

12. The system of claim 10, further comprising:
a warehouse maintainer that receives at least one of: the system level, database level, and indexing engine level commands from the information warehouse language processor and performs tasks specified by the at least one of: system level, database level, and indexing engine level commands to provide failure recovery for a failed data load from a source file into the information warehouse according to the commands from the user interface, the at least one of: system level, database level, and indexing engine level commands being hidden from the user.

13. The system of claim 10, further comprising:
a warehouse maintainer that receives the at least one of: system level, database level, and indexing engine level commands from the information warehouse language processor and performs tasks specified by the at least one of: system level, database level, and indexing engine level commands.

14. The system of claim 10, wherein the front-end graphical user interface further comprises:
a warehouse design manager that, based on the inputs from the user, generates declarative information warehouse language commands for building the information warehouse.

15. The system of claim 10, wherein the front-end graphical user interface further comprises:
a source mapping manager that, based on the inputs from the user, generates declarative information warehouse language commands for schema matching; and
a data loading manager that, based on the inputs from the user, generates declarative information warehouse language commands for data loading.

16. The system of claim 10, wherein the front-end graphical user interface further comprises:
a maintenance manager that, based on the inputs from the user, generates declarative information warehouse language commands for information warehouse failure recovery and error correction.

17. A computer program product for use with an information warehouse, the computer program product comprising a non-transitory computer readable medium including a computer executable program, wherein the computer executable program when executed on a computer causes the computer to:
accept commands of an information warehouse language using declarative statements provided by a script;
parse the commands from the script;
generate data description language commands from the parsed commands including information warehouse level commands that when implemented provide support for both structured and unstructured data;
execute the data description language commands to construct an information warehouse;
perform loading or copying of the structured and unstructured data, using:
indexing engine level commands configured to perform tasks specified by commands from an interface;
source mapping commands configured to perform at least one of: a data format transformation, source-to-target complex schema matching, and complex data value mapping;
data loading commands configured to perform at least one of: a data format transformation, source-to-target complex schema matching, and complex data value mapping;
dimension level commands that when implemented include at least one of: creating a dimension, altering the dimension, and dropping the dimension, and provide support for both structured and unstructured data; and
provide error correction for data loaded from a source file into the information warehouse using:
an abort command that uses a pending log to return the information warehouse to a consistent break point prior to a data load into the information warehouse so that operational details of maintaining data integrity for both the structured and the unstructured data are hidden from a user of the abort command, such that a load command automatically resumes loading data into the information warehouse from a last consistent breakpoint of a data load, while maintaining data integrity for both the structured and the unstructured data by performing system level tasks that are hidden from a user of the load command;
an undo command, operating with regard to a source file, that uses a checkpoint log to automatically return the information warehouse to a state of the information warehouse prior to loading of the source file, while maintaining data integrity for both structured and unstructured data by performing system level tasks that are hidden from a user of the undo command; and
a redo command, operating with regard to the source file, that uses the checkpoint log to automatically return the information warehouse to a state of the information warehouse after loading of the source file, wherein the loading of the source file has previously been undone, and while maintaining data integrity for both structured and unstructured data by performing system level tasks that are hidden from a user of the redo command.

18. The computer program product of claim 17, wherein the computer readable program when executed on a computer further causes the computer to:
generate, from the parsed commands, database independent designs for tables and indices according to the script;
translate the database independent designs into database-specific data description language statements for a user-selected target database using input from a database knowledge base; and
execute the data description language statements to construct the information warehouse.

19. The computer program product of claim 17, wherein:
the commands of the declarative information warehouse language are generated by a user interface that hides operational details from the user.

20. The computer program product of claim 17, wherein:
the commands of the declarative information warehouse language include information warehouse level commands for creating the information warehouse, using the information warehouse, and dropping the information warehouse.

21. The computer program product of claim 17, wherein:
the commands of the declarative information warehouse language include dimension level commands for at least one of: creating a dimension, altering the dimension, and dropping the dimension.

22. A computer program product for use with an information warehouse, the computer program product comprising a non-transitory computer readable medium including a computer executable program, wherein the computer readable program when executed on a computer causes the computer to:
accept commands of an information warehouse language using declarative statements provided by a script;
parse the commands from the script;
extract desired data from a source file according to the parsed commands;
transform the extracted data into a target format according to the parsed commands;
load the transformed data into information warehouse tables, file system locations according to the parsed commands;
perform loading or copying of the transformed data, using:
information warehouse level commands that provide support for both structured and unstructured data,
indexing engine level commands configured to perform tasks specified by the commands from an interface;

source mapping commands configured to perform at least one of: a data format transformation, source-to-target complex schema matching, and complex data value mapping;

data loading commands configured to perform at least one of: a data format transformation, source-to-target complex schema matching, and complex data value mapping; and dimension level commands that include at least one of: creating a dimension, altering the dimension, and dropping the dimension and provide support for both structured and unstructured data; and provide error correction for data loaded from a source file into the information warehouse using:

an abort command that uses a pending log to return the information warehouse to a consistent break point prior to a data load into the information warehouse so that operational details of maintaining data integrity for both the structured and the unstructured data are hidden from a user of the abort command, such that a load command automatically resumes loading data into the information warehouse from a last consistent breakpoint of a data load, while maintaining data integrity for both the structured and the unstructured data by performing system level tasks that are hidden from a user of the load command;

an undo command, operating with regard to the source file, that uses a checkpoint log to automatically return the information warehouse to a state of the information warehouse prior to loading of the source file, while maintaining data integrity for both the structured and the unstructured data by performing system level tasks that are hidden from a user of the undo command; and a redo command, operating with regard to the source file, that uses the checkpoint log to automatically return the information warehouse to a state of the information warehouse after loading of the source file, wherein the loading of the source file has previously been undone, and while maintaining data integrity for both the structured and the unstructured data by performing system level tasks that are hidden from a user of the redo command.

23. The computer program product of claim 22, wherein the extract process includes:

using input from a database and full text indexer knowledge base; and locating data in an XML source file using an xpath; and the transform process includes:

using input from the database and full text indexer knowledge base; and using a matching profile specified by the script.

24. The computer program product of claim 22, wherein: the commands of the declarative information warehouse language in the script are generated by a user interface that hides operational details from the user.

25. The computer program product of claim 22, wherein: the commands of the declarative information warehouse language in the script include a source mapping command for creating a matching profile.

26. The computer program product of claim 22, wherein: the commands of the declarative information warehouse language in the script include a data loading command for loading a source file using a matching profile.

* * * * *